2 Sheets—Sheet 1.
J. H. BUTTERWORTH.
MACHINE FOR MAKING BRACE JAWS FOR STEAM BOILERS.
No. 36,878. Patented Nov. 4, 1862.
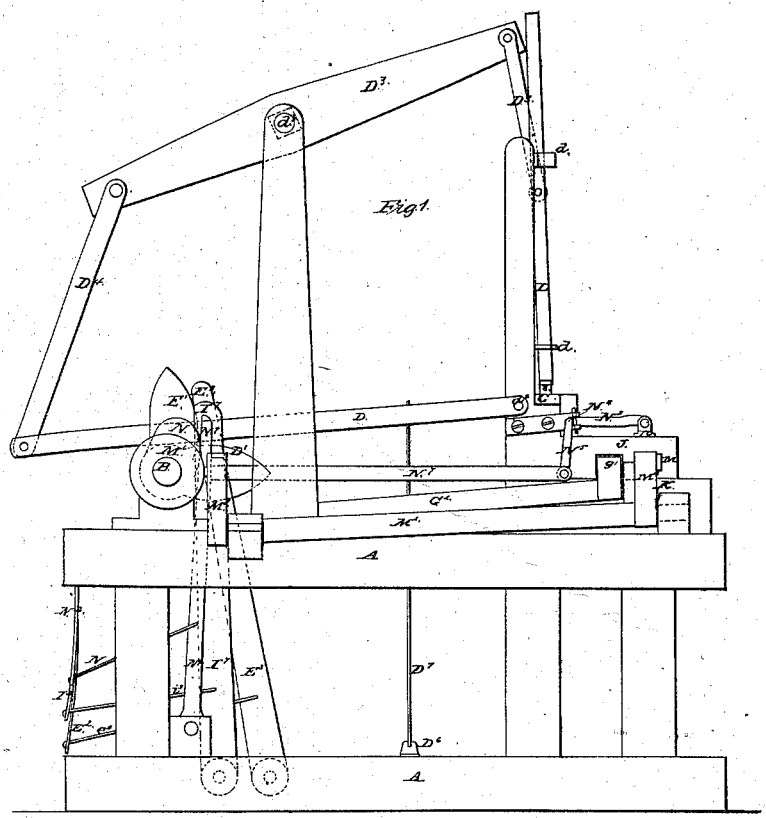
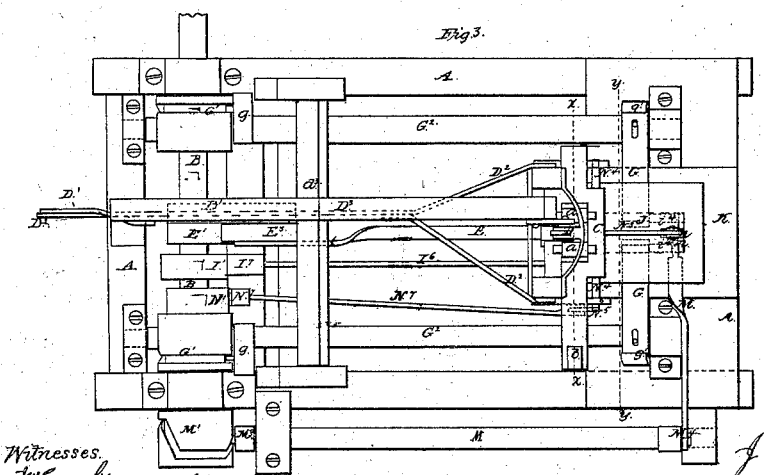

2 Sheets—Sheet 2.
J. H. BUTTERWORTH.
MACHINE FOR MAKING BRACE JAWS FOR STEAM BOILERS.
No. 36,878. Patented Nov. 4, 1862.
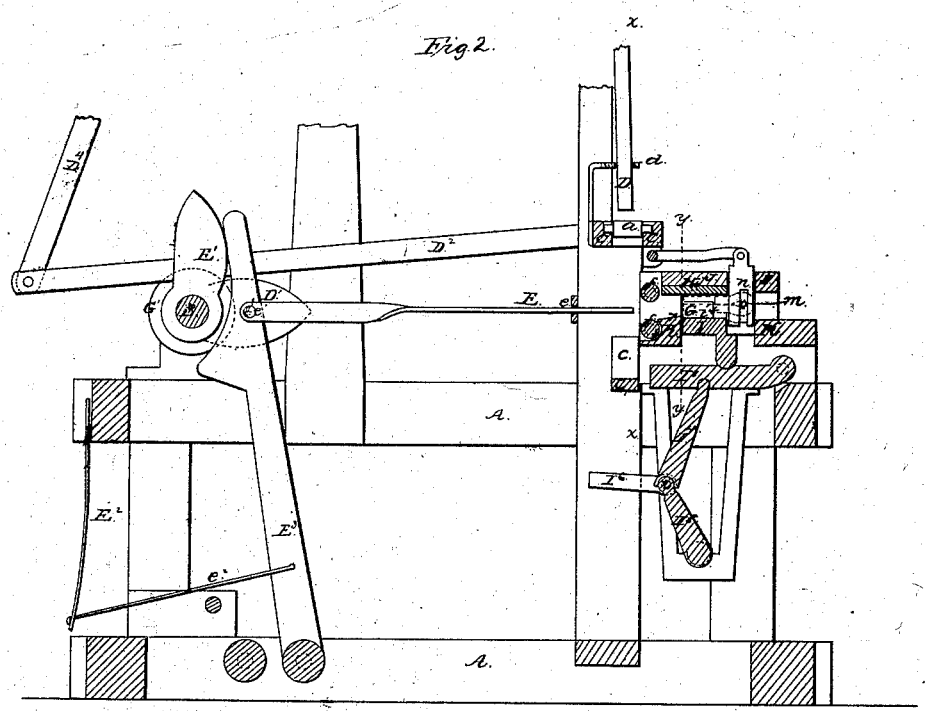
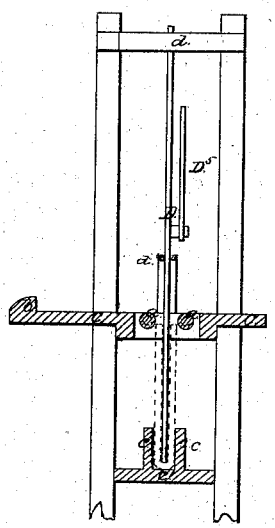
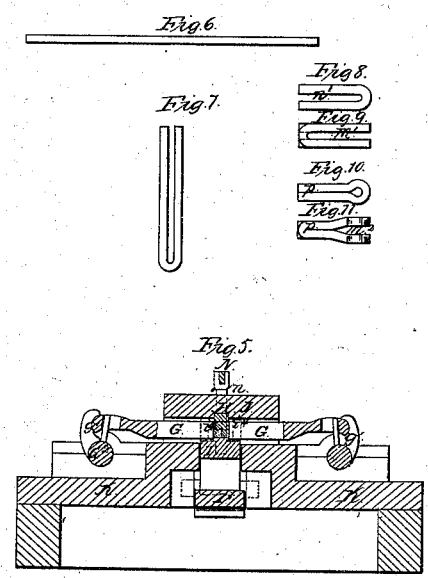
Witnesses.
Inventor.

UNITED STATES PATENT OFFICE.

JOSHUA H. BUTTERWORTH, OF DOVER, NEW JERSEY, ASSIGNOR TO HIMSELF AND HENRY McFARLAN, OF SAME PLACE.

IMPROVEMENT IN MACHINES FOR MAKING BRACE-JAWS FOR STEAM-BOILERS.

Specification forming part of Letters Patent No. 36,878, dated November 4, 1862.

*To all whom it may concern:*

Be it known that I, JOSHUA H. BUTTERWORTH, of Dover, in the county of Morris and State of New Jersey, have invented a new and useful Machine for Making the Jaws of Iron Braces for Steam-Boilers and other purposes; and I do hereby declare that the following is a full, clear, and exact description of the same, reference being had to the accompanying drawings, forming part of this specification, in which—

Figure 1 is a side elevation of the machine. Fig. 2 is a central vertical section of the same parallel with Fig. 1. Fig. 3 is a plan of the same. Fig. 4 is a vertical section at right angles to Figs. 1 and 2, in the plane indicated by the line $x\ x$ of Figs. 2 and 3. Fig. 5 is a vertical section parallel with Fig. 4, in the plane indicated by the line $y\ y$ in Figs. 2 and 3. Figs. 6, 7, 8, 9, 10, and 11 illustrate the forms which the iron assumes in the successive stages of the manufacture of the jaws.

Similar letters of reference indicate corresponding parts in the several figures.

This machine is composed of bending mechanism, pressing and forming dies, and mandrels, so combined and arranged as to take a straight bar of iron—such as shown in Fig. 6—double it to the form shown in Fig. 7, then by a second doubling bring it to the form shown in Figs. 8 and 9, which are views taken at right angles to each other, and afterward, by the action of the pressing-dies and mandrels, to bring it to the form shown in Figs. 10 and 11, which are views of different sides of the jaw.

To enable others to make and use my invention, I will proceed to describe it with reference to the drawings.

A is a horizontal frame, on or in which all the working parts of the machine are supported.

B is the main shaft, carrying the cams by which the movements of the several parts of the machine are to be produced, arranged horizontally in fixed bearings upon the frame.

C is a horizontal plate or table, upon which the piece of straight rod (represented in Fig. 6) cut to a proper length, and heated to a red heat, is laid to be subjected to the first doubling operation to bring it to the shape represented in Fig. 7. This operation is performed by means of a straight, flat, vertical plunger, D, which drives it down between two rollers, $a\ a$, arranged at suitable distances apart in suitable fixed bearings in the said plate.

To insure the bending of the said rod exactly at the middle of its length, a fixed step or gage, $b$, is suitably arranged upon the table on the opposite side of the rollers to that from which the rod is placed on the said plate, and by pushing the said rod up against this stop the middle of its length is brought directly under the plunger, and over the middle of the space between the rollers $a\ a$. The plunger D works through guides $d\ d$, and is made to derive the necessary movement downward and upward once during every revolution of the main shaft B from the cam $D'$ and a spring, $D^6$, said movement being transmitted through two levers, $D^2\ D^3$, two rods, $D^4\ D^5$, and a rod, $D^7$, arranged as shown in Fig. 1, the lever $D^2$, working on a fulcrum, $d^2$, and that $D^3$ on a fulcrum, $d^3$, and the cam and spring acting directly upon the lever $D^2$, which is connected with the said spring by the rod $d^7$, the said spring being secured to the frame A.

By the completion of the first doubling operation, as above described, the bend of this rod is brought down between two guides, $c\ c$, to a fixed rest, $c'$, (best shown in Fig. 4,) while the extremities do not quite pass the axes of the rollers $a\ a$, and the doubled rod is left in an upright position in rear of a second pair of friction-rollers, $f\ f$, Fig. 2, which are arranged one above the other in such position that the middle of the space between them is opposite to the middle of the length of the doubled rod that by the advance between the said rollers of a second flat plunger E working horizontally the rod may be doubled the second time, and thus brought to the shape shown in Figs. 8 and 9. The plunger E works through a guide, $e$, and derives its motion from the cam $E'$ and a spring, $E^2$, the motion being imparted through a lever, $E^3$, with which the said plunger is connected at $e'$, and which is kept in contact with the said cam by the said spring, which is attached to the frame A, and connected with the lever by a rod, $e^2$. By the completion of this second bending process the piece is delivered between the two opposite horizontally-moving dies, G G, Figs. 3 and 5, under the fixed die H, and over the vertically-moving die I, and in such position that the horizontally-moving mandrel $m$ may pass through its bend $n'$, Fig. 8, to form the eyes $n^2$, (see Fig. 10,) and that the forked vertically-moving mandrel $n$ may pass into the opening $m'$, (see Fig. 9,) to form an opening, $m^2$, of proper shape (see Fig. 11) between the sides of the jaw, the said mandrel $n$ being made forked to allow the mandrel $m$ to work transversely through it. The horizontally-moving dies G G work through openings in the sides of a block, J, which is bolted onto a bed-piece, K, secured on the main frame, the said block containing the bearings for the upper roller, $f$, and having fitted to it the fixed die H, and the before-mentioned openings in the sides of the said block serving as guides to the dies G G. The said block has also an opening directly through it from back to front for the passage of the bar during the second doubling process and for the discharge of the finished brace-jaw. It has also another opening in one side for the admission of the stock M of the plunger $m$, and an opening in the top for the admission of the plunger $n$, the two latter openings serving as guides to the plungers.

The duty of the dies G G H I is to press together the portions of the twice-doubled bar, which is to form the neck $p$, Figs. 10 and 11, of the jaw, the dies G G operating to close the said portions at the back of the opening $m'$ formed by the mandrel $n$, and the dies H and I operating in conjunction with the mandrel upon the top and bottom, or, more properly speaking, the front end back of the jaws to form the eyes.

The operation of the dies G G is produced once during every revolution of the main shaft B by the two cams G' G' through two rock-shafts, $G^2 G^2$, which are each furnished with two arms, $g\ g'$, and are arranged parallel with each other, but at right angles to the main shaft B, and slightly inclined from a horizontal position in fixed bearings on the frame A. These rock-shafts derive motion from the cams through their two arms, $g\ g'$, which carry friction rollers or studs entering grooves in the cams, and the said rock-shafts transmit motion to the dies by the connection of the latter with their arms $g\ g'$.

The die I, which works through a vertical opening in the bed-piece K, has standing up from it, on opposite sides of its working-face, two guide-pieces, $i^4\ i^4$, at a distance apart equal to the external width of the jaws, and it derives motion upward and downward once during every revolution of the main shaft from the cam I' and a spring, $I^2$. The said die is supported upon a lever, $I^3$, Fig. 2, which works on a fixed fulcrum, $i$, and which has applied below it a toggle, $I^4 I^5$, the lower link of which oscillates from a fixed bearing, and to the joint $i'$ of which there is connected a rod, $I^6$, the opposite end of which is connected with a lever, $I^7$, which is always kept in contact with the cam I' by means of the spring $I^2$, which is attached to the frame and connected with the said lever by a rod, $i^3$.

The mandrel $m$ is operated by means of a grooved cam, M', through the agency of a rock-shaft, $M^2$, which has two arms, $M^3 M^4$, and which is arranged in a nearly horizontal position and at right angles to the main shaft in fixed bearings at one side of the framing A. The said cam acts upon a stud attached to the arm $M^3$ to produce the oscillation of the shaft, and the arm $M^4$ has the stock of the mandrel connected with it.

The mandrel $n$ is operated by the cam N' and a spring, $N^2$. The said mandrel is suspended from the arm $N^3$ of a horizontal rock-shaft, $N^4$, another arm, $N^5$, of which is connected with a lever, $N^7$, which is kept in contact with the cam by the spring $N^2$, which is secured to the frame and connected with the lever by a rod, $N^8$.

The operations of the several parts of the machine are successively performed as follows: The plunger D descends and produces the first doubling of the piece of iron and quickly rises again to get out of the way of the plunger E, which then advances to effect the second doubling operation and retires quickly, leaving the iron between the dies G G H I, and in front of a projection, $r$, provided on the bed K, to prevent it from going back with the plunger E. The mandrel $n$ then commences its descent into the opening $m'$, (see Fig. 9,) which is quickly followed by the movement of the mandrel $m$ into the bend $n'$. (See Fig. 8.) When the mandrels have been thus inserted, the simultaneous advance of the dies G G and upward movement of the die I complete the manufacture of the jaw and bring it to the shape represented in Figs. 10 and 11, ready to be welded to the brace. The retirement of the dies G G from the jaw and descent of the die I leaves the work free to be pushed forward out of the machine by the next operation of the bending-mandrel E to bend the next bar. While one jaw is being finished the bar to make the next one is being subjected to the first bending operation by the plunger D, so that a jaw is turned out complete at every revolution of the shaft, the cams severally operating once in every revolution, and being so arranged on the shaft as to properly time the operations of the several parts of the machine.

Instead of the single mandrel $m$ inserted entirely through the jaws from one side of the machine, there may be two mandrels of similar character, but shorter, applied to be operated in a substantially similar manner and inserted in the jaws from opposite sides of the machine, each passing through one side of the jaw and forming the eye therein. By the use of two mandrels in this manner I am enabled to make both eyes exactly of the same size, whereas, owing to the necessity of the mandrel being slightly taper one of the eyes formed by the long mandrel inserted through the jaw from one side will be somewhat larger than the other.

What I claim as my invention, and desire to secure by Letters Patent, is—

1. The combination of the two plungers D and E and their respective rollers $a\,a$ and $f\,f$, arranged and operating, as described, to bring the bar from the condition shown in Fig. 6 to that shown in Figs. 8 and 9.

2. The combination of the dies G G, H, and I, and the mandrels $m$ and $n$, the whole arranged and operated substantially as and for the purpose herein specified.

3. Constructing the mandrel $n$ in a forked form to allow the passage of the mandrel $m$ through it, substantially as herein described.

4. The combination of the plungers D E, rollers $a\,a\,f\,f$, dies G G H I, and mandrels $m\,n$, the whole arranged to operate substantially as herein specified.

JOSHUA H. BUTTERWORTH.

Witnesses:
  G. M. HINCHMAN,
  JOHN G. MARE.